(12) United States Patent
Takizawa et al.

(10) Patent No.: US 12,177,916 B2
(45) Date of Patent: Dec. 24, 2024

(54) BASE STATION, SYSTEM AND INFORMATION PROCESSING METHOD

(71) Applicant: TOYOTA JIDOSHA KABUSHIKI KAISHA, Toyota (JP)

(72) Inventors: Kenichi Takizawa, Koganei (JP); Masafumi Moriyama, Koganei (JP); Fumihide Kojima, Koganei (JP); Atsushi Kurosawa, Fuchu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 292 days.

(21) Appl. No.: 17/711,317

(22) Filed: Apr. 1, 2022

(65) Prior Publication Data
US 2022/0330365 A1 Oct. 13, 2022

(30) Foreign Application Priority Data
Apr. 8, 2021 (JP) .................. 2021-065982

(51) Int. Cl.
*H04W 76/15* (2018.01)
*H04W 76/12* (2018.01)
*H04W 88/08* (2009.01)

(52) U.S. Cl.
CPC .......... *H04W 76/15* (2018.02); *H04W 76/12* (2018.02); *H04W 88/08* (2013.01)

(58) Field of Classification Search
CPC .... H04L 5/0023; H04W 16/14; H04W 76/12; H04W 76/15; H04W 88/08
See application file for complete search history.

(56) References Cited

U.S. PATENT DOCUMENTS

2017/0310436 A1* 10/2017 Nuzman ............. H04L 25/0224
2018/0287828 A1* 10/2018 Tavares .................. H04J 11/004

OTHER PUBLICATIONS

Yoshihisa Kishiyama et al., "Latest Radio Access Technologies for 5G Systems and Field Testing Results—Technologies Realizing Ultra-high-speed Data Transport, High-speed Mobility, and Improved Spectral Efficiency—", NTT DOCOMO Technical Journal, Apr. 2017, vol. 25, No. 1, pp. 16-29.

(Continued)

*Primary Examiner* — Mansour Oveissi
(74) *Attorney, Agent, or Firm* — Finnegan, Henderson, Farabow, Garrett, and Dunner, LLP (57) ABSTRACT

Each base station executes: a first process of acquiring a first signal from a first terminal from among signals simultaneously received from N terminals, and acquiring first data by demodulating and decoding the first signal; a second process of generating a second signal, which is a replica of a signal arriving from the first terminal based on the first data; a third process of acquiring signals by excluding the second signal from the signals simultaneously received from the N terminals; and sequentially repeating the first to third processes for the extracted signals, with one of N-1 terminals as a new first terminal. The base station shares the first data with other base stations through a backbone line, and, if the N terminals is larger than the M receive antennas in number, executes the second and third processes, using the first data received from another base station.

9 Claims, 7 Drawing Sheets

(56) References Cited

OTHER PUBLICATIONS

Yoshihisa Kishiyama et al., "Latest Radio Access Technologies for 5G Systems and Field Testing Results—Technologies Realizing Ultra-high-speed Data Transport, High-speed Mobility, and Improved Spectral Efficiency—", NTT DOCOMO Technical Journal, Jul. 2017, vol. 19, No. 1, pp. 15-29.
Satoshi Suyama et al., "5G Multi-Antenna Technology", NTT DOCOMO Technical Journal, Jan. 2016, vol. 23, No. 4, pp. 30-39.
Satoshi Suyama et al., "5G Multi-Antenna Technology", NTT DOCOMO Technical Journal, 2016, vol. 17, No. 4, pp. 29-39.

* cited by examiner

| TERMINAL ID | BASE STATION A | BASE STATION B | ... | DEMODULATED |
|---|---|---|---|---|
| 001 | 1 | 0 |  | 1 |
| 002 | 1 | 1 |  | 1 |
| 003 | 1 | 1 |  | 0 |
| 004 | 1 | 1 |  | 0 |
| ⋮ |  |  |  |  |

FIG. 7

BASE STATION, SYSTEM AND INFORMATION PROCESSING METHOD

CROSS REFERENCE TO THE RELATED APPLICATION

This application claims the benefit of Japanese Patent Application No. 2021-065982, filed on Apr. 8, 2021, which is hereby incorporated by reference herein in its entirety.

BACKGROUND

Technical Field

The present disclosure relates to wireless communication.

Description of the Related Art

There is an increasing need to use a terminal capable of connecting to a public network such as the Internet for control, for example, like IoT (Internet of Things), and low latency of wireless communication to access a public network is needed. In wireless communication, Multiple Input Multiple Output (MIMO) is used. MIMO is a technology in which each of a base station and a terminal communicates in the same frequency band with a plurality of antennas. Further, in MIMO, a technology in which a plurality of terminals are involved in communication at the same time is called multi-user MIMO. The number of terminals that access a public network is expected to increase in the future with development of such wireless communication technologies, and uplink tightness is a matter of concern.

Terminals transmit radio waves using Power Domain UpLink Non-Orthogonal Multiple Access (PD-UL-NOMA). PD-UL-NOMA is a technology that makes multiplexing possible with power domains at the same time and at the same frequency in an uplink, in addition to domains divided by time and frequency. Thereby, it becomes possible to simultaneously connect the number of transmit antennas larger than the number of receive antennas, that is, the number of terminals larger than the number of receive antennas.

CITATION LIST

Non-Patent Literature

Non-Patent Literature 1: Yoshihisa Kishiyama, Satoshi Suyama, Yukihiko Okumura, "Latest Radio Access Technologies for 5G Systems and Field Testing Results—Technologies Realizing Ultra-high-speed Data Transport, High-speed Mobility, and Improved Spectral Efficiency-", NTT DoCoMo Technical Journal, April 2017, Vol. 25, No. 1, pp. 16-29.

Non-Patent Literature 2: Satoshi Suyama, Tatsuki Okuyama, Yuki Inoue, Yoshihisa Kishiyama, "5G Multi-antenna Technology", NTT DoCoMo Technical Journal, January 2016, Vol. 23, No. 4, pp. 30-39.

However, if the number of terminals that perform transmission to a base station at the same timing increases, and the number of connecting terminals is larger than the number of receive antennas, for example, like communication using PD-UL-NOMA, the possibility that the communication quality deteriorates becomes strong.

A subject of an embodiment of the present disclosure is to provide a base station, a system and a method that are capable of suppressing deterioration of the quality of wireless communication.

SUMMARY

One of aspects of the present disclosure is a base station comprising:
a communication unit configured to connect to a backbone line to which one or more base stations connect;
M ($1<M$) receive antennas; and
a processor configured to execute:
a first process of acquiring, from among received signals simultaneously received from N ($1<N$) terminals, a first signal from a first terminal by a predetermined process, and acquiring first data by demodulating and decoding the first signal, wherein the first terminal is one of the N terminals;
a second process of generating a second signal, which is a replica of a signal arriving from the first terminal before the predetermined process is performed, based on the first data;
a third process of acquiring third signals obtained by excluding the second signal from the received signals; and
sequentially repeating the first to third processes for the third signals, with one of N−1 terminals obtained by excluding the first terminal from the N terminals as a new first terminal; wherein
the processor is configured to share the first data acquired by the first process with one or more other base stations through the backbone line; and
the processor is configured to execute, if the N terminals is larger than the M receive antennas in number, the second and third processes for terminals for which the first data has not been acquired by the first process, using the first data received from any of the one or more other base stations.

Another aspect of the present disclosure is a system comprising a plurality of sets of a base station and a server:
the base station including:
a communication unit configured to connect to a backbone line to which one or more base stations connect;
M ($1<M$) receive antennas; and
a processor configured to execute:
a first process of acquiring, from among received signals simultaneously received from N ($1<N$) terminals, a first signal from a first terminal by a predetermined process, and acquiring first data by demodulating and decoding the first signal, wherein the first terminal is one of the N terminals;
a second process of generating a second signal, which is a replica of a signal arriving from the first terminal before the predetermined process is performed, based on the first data;
a third process of acquiring third signals obtained by excluding the generated second signal from the received signals; and
sequentially repeating the first to third processes for the third signals, with one of N−1 terminals obtained by excluding the first terminal from the N terminals as a new first terminal;
wherein
the processor is configured to share the first data acquired by the first process with one or more other base stations through the backbone line;

the processor is configured to execute, if the N terminals is larger than the M receive antennas in number, the second and third processes for terminals for which the first data has not been acquired by the first process, using the first data received from any of the one or more other base stations; and the server is configured to perform a process according to the first data acquired by the first process by the base station to respond to the first terminal.

Another aspect of the present disclosure is a method comprising: executing, by a base station, a first process, a second process, and a third process, wherein the base station includes a communication unit configured to connect to a backbone line to which one or more base stations connect, and M (1<M) receive antennas;

the first process includes acquiring, from among received signals simultaneously received from N (1<N) terminals, a first signal from a first terminal by a predetermined process, and acquiring first data by demodulating and decoding the first signal, wherein the first terminal is one of the N terminals;

the second process includes generating a second signal, which is a replica of a signal arriving from the first terminal before the predetermined process is performed, based on the first data; and the third process includes acquiring third signals obtained by excluding the second signal from the received signals; and sequentially repeating, by the base station, the first to third processes for the third signals, with one of N−1 terminals obtained by excluding the first terminal from the N terminals as a new first terminal, wherein the method further includes sharing, by the base station, the first data acquired by the first process with one or more other base stations through the backbone line; and executing, by the base station, if the N terminals is larger than the M receive antennas in number, the second and third processes for terminals for which the first data has not been acquired by the first process, using the first data received from any of the one or more other base stations.

According to one of aspects of the present disclosure, it is possible to prevent deterioration of the quality of wireless communication.

DESCRIPTION OF THE EMBODIMENTS

One of aspects of the present disclosure is a base station including a communication unit configured to connect to a backbone line to which one or more base stations are connected, M (1<M) receive antennas, and a processor. When simultaneously receiving signals from N (1<N) terminals, the processor may repeatedly execute the following first, second and third processes.

The first process is a process of acquiring, from among received signals simultaneously received from N terminals, a first signal from a first terminal by a predetermined process, and acquiring first data by demodulating and decoding the first signal, wherein the first terminal is one of the N terminals. The second process is a process of generating a second signal, which is a replica of a signal arriving from the first terminal before the predetermined process is performed, based on the first data acquired by the first process. The third process is a process of acquiring third signals obtained by excluding the second signal generated by the second process from the signals simultaneously received from the N terminals. The processor may repeat the first to third processes for the third signals acquired by the third process, with one of N−1 terminals obtained by excluding the first terminal from the N terminals as a new first terminal. The first, second and third processes are a process called Successive Interference Cancellation (SIC).

The predetermined process is a process of taking out the signal that has arrived from the first terminal, from among the signals simultaneously received from the N terminals. As the process of taking out the signal that has arrived from the first terminal, from among the received signals simultaneously received from the N terminals, there is, for example, receive diversity processing. As the receive diversity processing, there is, for example, Minimum Mean Square Error (MMSE) processing. In the receive diversity processing, by using a weight W defined using a channel matrix H, the signal that has arrived from the first terminal is taken out from among the signals simultaneously received from the N terminals, and signals from the other terminals are cancelled as interference signals. The process of separating the signal that has arrived from the first terminal from the received signals simultaneously received from the N terminals is not limited to a particular method.

A "signal" stated in the present disclosure refers to a signal in a state of not being binarized with 0s and 1s, including an analog signal and a digital signal. In the present disclosure, "data" refers to a signal binarized with 0s and 1s.

In the one of the aspects of the present disclosure, the processor of each base station may share the first data acquired by the first process with one or more other base stations through the backbone line. Further, if the N terminals is larger than the M receive antennas in number, the processor of the base station may execute the second and third processes for terminals for which the first data has not been acquired by the first process, using the first data of the terminal received from any of the one or more other base stations.

When the N terminals are larger than the M receive antennas in number, it is not possible to cancel signals from N-M terminals even if the predetermined process is performed, and the signals remain as interference signals. Therefore, there may be a case where an error occurs due to influence of the interference signals at the time of demodulating the signal that has arrived from the first terminal, and it is not possible to acquire the first data. In the one of the aspects of the present disclosure, the first data of each terminal acquired by each base station is shared among the base stations. Therefore, even if it is not possible to acquire the first data from the first terminal, it is possible to create a second signal, which is a replica of a signal that has arrived from the first terminal, using the first data corresponding to the first terminal received from another base station, and remove the second signal from the signals extracted by the previous third process. Thereby, even if it is not possible to acquire the first data from one terminal at a base station, it is possible to create a second signal using the first data received from another base station and remove the second signal. Therefore, the number of signals to be interference signals for signals from remaining terminals decreases. Thereby, it is possible to continue the first to third processes for the remaining terminals, and the possibility that the number of such terminals that a signal that has arrived therefrom can be separated from signals simultaneously received from N terminals. Therefore, inter-terminal interference removal performance is improved.

One of other aspects of the present disclosure is a system including a plurality of combinations of the base station described above and a server that performs a process according to the first data acquired by the first process by the base station to respond to the first terminal. The server is, for example, an MEC server. According to the one of the other aspects of the present disclosure, the first data acquired by being demodulated and decoded by a base station is processed by a server connected to the base station, and a response as a processing result is returned to the first terminal. Therefore, low latency can be achieved.

The system, which is the one of the other aspects of the present disclosure, may further include an information processing apparatus that includes a communication unit that is connected to the backbone line, and a processor configured to: receive the first data transmitted from the base station; and transmitting the first data to the one or more other base stations. Thereby, it is possible to collect the first data acquired by each base station to the information processing apparatus. Further, since the first data is data binarized with 0s and 1s, the size is small, and the bandwidth of the backbone line to be used can be reduced. Further, the load on the information processing apparatus can be reduced in comparison with a system where a signal received by each base station is collected to an information processing apparatus, and the information processing apparatus performs a process of separating a signal from each terminal, and modulation and decoding processes.

Further, in the one of the other aspects of the present disclosure, the processor of the information processing apparatus may identify first base stations receiving a signal from the first terminal corresponding to the first data received from one base station and transmit the received first data to the first base stations among the one or more other base stations. Thereby, transmission of the first data from the one base station to base stations that have not received the first data is not performed, and, therefore, use of the bandwidth of the backbone line can be reduced.

Further, in the one of the other aspects of the present disclosure, the processor of the information processing apparatus may be configured to transmit an instruction to stop the first to third processes to a plurality of base stations including the plurality of the sets when the first data is acquired from all of a plurality of terminals existing in a cell including the plurality of base stations. Thereby, even in the middle of performing the first to third processes for all the N terminals from which signals have been received, each base station can stop the processes if receiving the instruction to stop from the information processing apparatus, and, therefore, it is possible to reduce the processing load on each base station.

As one of the other aspects of the present disclosure, a method for the base station described above to perform the above processes can be identified. Further, as other aspects of the present disclosure, a program for causing a computer to execute the processes of a base station described above, and a non-transitory computer-readable recording medium stored with the program also can be identified.

In the following, an embodiment of the present disclosure will be described with reference to the drawings. The configuration of the embodiment described below is an example, and the present disclosure is not limited to the configuration of the embodiment.

First Embodiment

Figure 1:
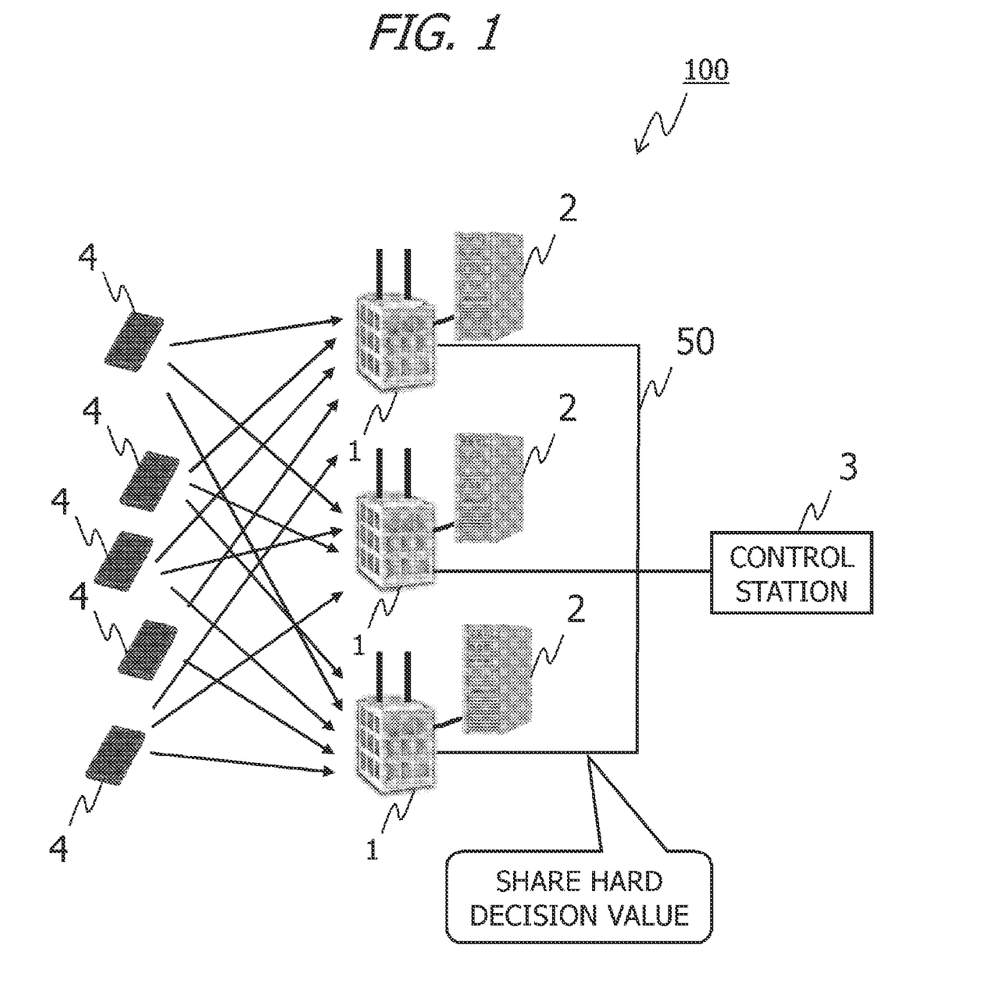
FIG. 1 is a diagram illustrating a configuration of a wireless communication system according to a first embodiment.

FIG. 1 is a diagram illustrating a configuration of a wireless communication system 100 according to a first embodiment. The wireless communication system 100 includes a plurality of base stations 1, a plurality of MEC (multi-access edge computing or mobile edge computing) servers 2 connecting to the base stations 1, respectively, one to one, a control station 3 that manages the base stations 1 and a plurality of terminals 4 that wirelessly communicate with the base stations 1. The plurality of base stations 1 are base stations existing in one cell managed by the control station 3. The base stations 1 and the control station 3 are connected via a backbone line 50.

In the first embodiment, each base station 1 is provided with M receive antennas and performs multi-user MIMO. Each terminal 4 transmits electric waves using PD-UL-NOMA. Therefore, in the first embodiment, each base station 1 simultaneously receives signals from a plurality of terminals 4. In a signal the base station 1 receives by MIMO, the signals from the plurality of signals 4 are superimposed on one another, and, therefore, the base station 1 separates a signal from each terminal 4 from the received signals. As one of methods for separating a signal from each terminal 4 from the superimposed signal, there is Successive Interference Cancellation (SIC).

Figure 2:
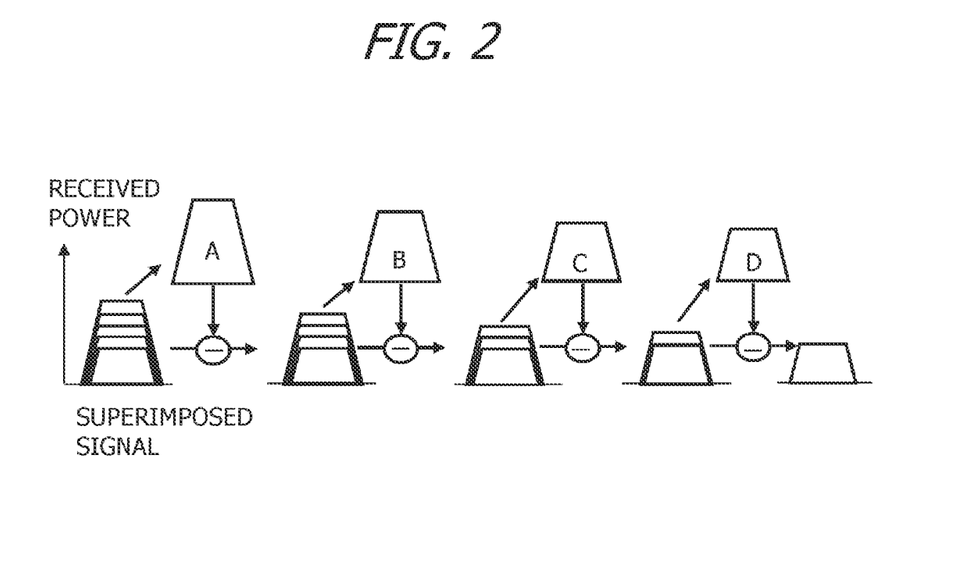
FIG. 2 is a diagram illustrating an example of an SIC process.

FIG. 2 is a diagram illustrating an example of an SIC process. FIG. 2 illustrates an example of a case where, from a superimposed signal that includes signals from five terminals A to E, a signal from each of the terminals A to E is separated. In the SIC process, three processes of (1) a desired signal data acquisition process, (2) a replica signal generation process and (3) a replica signal removal process are repeatedly executed.

In (1) the desired signal data acquisition process, a signal from one target terminal is first taken out by performing receive diversity processing for a received signal (a superimposed signal) received by antennas. The signal from the one target terminal will be hereinafter referred to as a desired signal. Taking out the desired signal from the superimposed signal is also referred to as separating the desired signal. Terminals for which desired signals have not been taken out from the superimposed signal will be referred to as unseparation terminals.

In the receive diversity processing, signals from terminals other than the target terminal are cancelled as interference signals by performing a predetermined operation using a predetermined weight W, and the desired signal from the target terminal can be acquired as an operation result. By performing demodulation and decoding for the desired signal, data transmitted from the target terminal is acquired. For the data obtained by demodulation and decoding, an error check is performed with an error correction code such as a CRC (cyclic redundancy check) code. Data binarized with 0s and 1s will be hereinafter referred to as a hard decision value.

In the first embodiment, a "signal" refers to a signal that is not binarized with 0s and 1s, and "data" refers to a signal binarized with 0s and 1s. For example, though a baseband signal is a digital signal, it is referred to as a "signal" in the first embodiment because it is not binarized with 0s and 1s. In the first embodiment, though both of data and a hard decision value indicate the same thing that is binarized with 0s and 1s, data which is binarized with 0s and 1s and in which an error has not been detected by an error check, among data obtained by demodulating and decoding a signal, will be distinguishedly referred to as a hard decision value. The signal from the one target terminal taken out from the superimposed signal is an example of the "first signal". If, in the data obtained by demodulating and decoding the signal from the one target terminal taken out from the superimposed signal, an error is not detected by a CRC error check, the data (hard decision value) is an example of the "first data".

In (2) the replica signal generation process, the hard decision value is encoded and modulated to generate a replica of the desired signal. The replica of the desired signal will be referred to as a replica signal. In (3) the replication signal removal process, the replica signal of the desired signal is removed from the superimposed signal. The replica signal is an example of the "second signal".

By the processes of (1) to (3) being repeatedly performed for the superimposed signal from which the replica signal has been removed and an unseparation terminals again, a signal from each terminal included in the superimposed signal is separated. The SIC process ends, for example, by separation having been performed for all the terminals or by an error occurring in an error check. Here, (1) the desired signal data acquisition process is an example of the "first process"; (2) the replica signal generation process is an example of the "second process"; and (3) the replica signal removal process is an example of the "third process".

In the example illustrated in FIG. 2, a desired signal of the terminal A is acquired first, and a replica signal of the desired signal of the terminal A is removed from the superimposed signal that includes signals of the terminal A to E. Next, a desired signal of the terminal B is acquired, and a replica signal of the desired signal of the terminal B is removed from the superimposed signal that includes the signals of the terminals B to E. Next, a desired signal of the terminal C is acquired, and a replica signal of the desired signal of the terminal C is removed from the superimposed signal that includes the signals of the terminals C to E. Lastly, a desired signal of the terminal D is acquired; a replica signal of the desired signal of the terminal D is removed from the superimposed signal that includes the signals of the terminals D and E; the remaining signal becomes a desired signal of the terminal E; and the SIC process ends. In the example illustrated in FIG. 2, the processes of (1) to (3) are repeated four times. Order of terminals for which a signal is separated is, for example, descending order of powers of received signals of the terminals. However, the order is not limited thereto.

Returning to FIG. 1, in the first embodiment, it is assumed that a state of overload MIMO may occur in which the number of terminals N is larger than the number of receive antennas M of a base station 1. In the case of overload MIMO, it is not possible to cancel signals from N-M terminals even if a predetermined receive diversity weight W is used, because the number of transmitting terminals (N) is larger than the receive antennas (M) of the base station. Since the signals from the N-M terminals which it is not possible to cancel remain as interference signals, the possibility that an error occurs in data obtained by demodulating and decoding a desired signal due to influence of the interference signals at the time of demodulating the desired signal may be strong. That is, in the case of overload MIMO, an error occurs in data obtained by demodulation and decoding by an error check in (1) the desired signal data acquisition process of the SIC process, and the possibility that a terminal for which it is not possible to obtain a hard decision value occurs becomes strong.

If a hard decision value is not obtained in (1) the desired signal data acquisition process of the SIC process, it is not possible to perform the subsequent (2) replica signal generation process and (3) replica signal removal process. Therefore, the SIC process itself ends at that point of time. Then, there is a possibility that, among terminals from which signals have received, the number of terminals for which it is not possible to obtain data increases.

Further, if a hard decision value is not obtained in (1) the desired signal data acquisition process, at first, the SIC process may be executed for another unseparation terminal, and, at any timing after that, the SIC process may be executed again for the terminal for which a hard decision value has not been obtained. However, in this case also, there is a possibility that hard decision values are not obtained for any of all terminals the signals of which are included in the superimposed signal.

Therefore, in the first embodiment, each base station 1 sends a hard decision value acquired in (1) the desired signal data acquisition process of the SIC process to the backbone line 50 together with identification information about a target terminal to share the hard decision value and the identification information among the base stations 1. If the hard decision value is not obtained in (1) the desired signal data acquisition process of the SIC process, the base station executes (2) the replica signal generation process and (3) the replica signal removal process using a hard decision value of the target terminal acquired by another base station 1.

Thereby, it is possible to, even if it is not possible to acquire a hard decision value in (1) the desired signal data acquisition process, continue the SIC process, and it is possible to reduce the number of terminals for which it is not possible to obtain a hard decision value.

Further, in the first embodiment, since demodulation of signals from terminals 4 is performed to acquire data in each base station 1, the MEC servers 2 are connected to the base stations 1, respectively. Each MEC server 2 executes a predetermined process corresponding to data, such as an HTTP (Hypertext Transfer Protocol) response, and returns responses to the data transmission source terminals 4. That is, since the data from the terminals 4 demodulated by the base station 1 is processed by the MEC server 2 connected to the base station 1, the data can be processed without being sent to the backbone line 50, and time to response to the terminals 4 is shortened. Therefore, it is possible to achieve low latency. The MEC server 2 is an example of the "server".

The control station 3 receives a hard decision value and identification information about terminals 4 from each base station 1 and transmits the hard decision value and the identification information about terminals 4 to other base stations 1. Thereby, even when there are three or more base stations in a cell, it is possible to cause a hard decision value to be shared among the base stations 1.

Further, when MIMO reception occurs in the cell, the control station 3 receives a report of information about terminals 4 from which each base station 1 has received signals, from the base station 1, and grasps modulation states of signals of the terminals transmitting signals in the cell under the control of the control station 3 from hard decision value and identification information about the terminals 4 transmitted from each base station 1. When modulation of the signals of all the terminals 4 transmitting signals in the cell under the control of the control station 3 is completed, the control station 3 instructs each base station 1 to end MIMO. When receiving the instruction to stop the MIMO reception process from the control station 3, each base station 1 stops the SIC process and deletes information about the MIMO reception. Thereby, the SIC process does not need to be executed excessively in the base stations 1, and the processing load on the base stations 1 is reduced. The control station 3 is an example of the "information processing apparatus".

Figure 3:
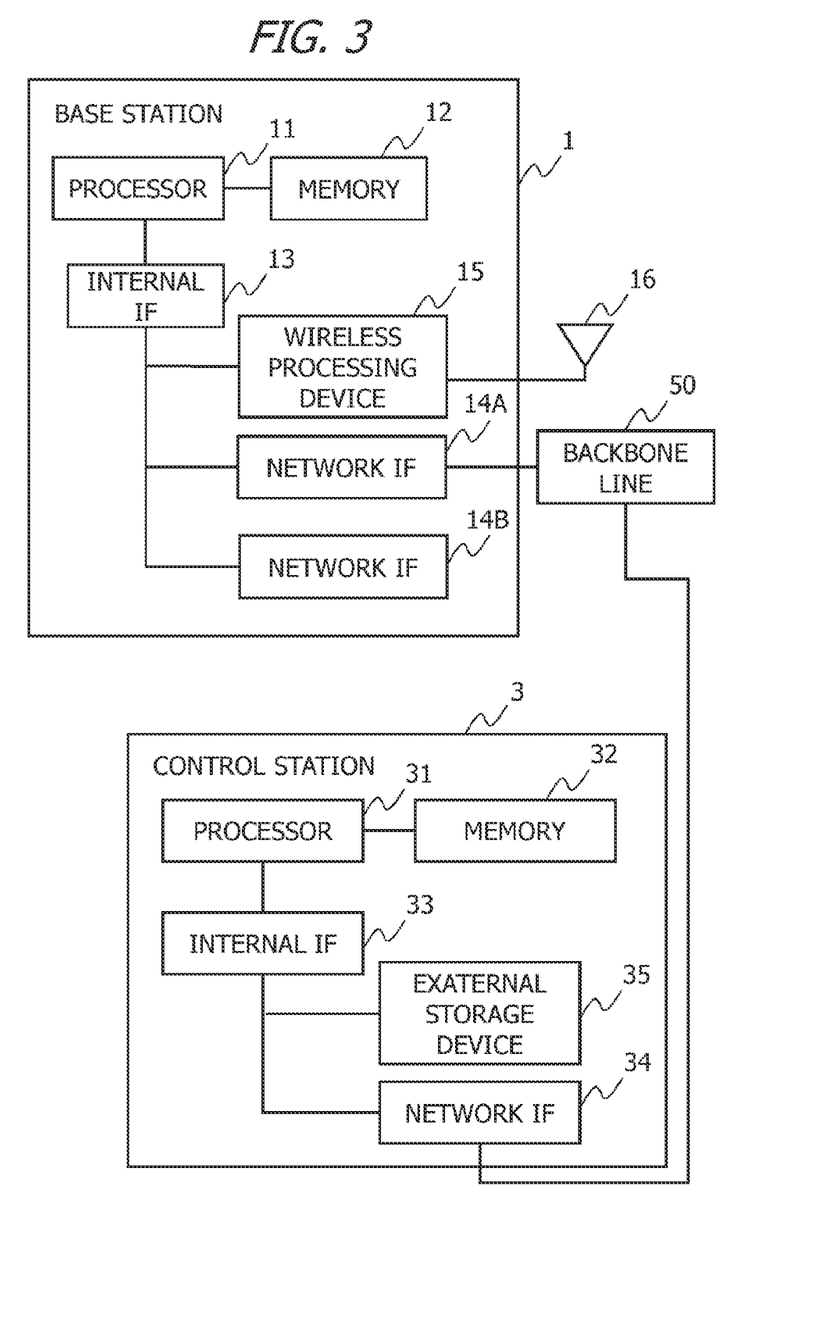
FIG. 3 is a diagram illustrating an example of hardware components of each base station and the control station of the first embodiment.

FIG. 3 is a diagram illustrating an example of hardware components of each base station 1 and the control station 3 of the first embodiment. Each base station 1 has a processor 11, a memory 12, an internal interface (IF) 13, a network IF 14A that connects to the backbone line 50, a network IF 14B that connects an MEC server 2, a wireless processing device 15 and antennas 16 as hardware components.

The processor 11 is, for example, a central processing unit (CPU) or a microprocessor unit (MPU). The processor 11 is not limited to a single processor but may be in a multi-processor configuration. Further, a single physical CPU connected with a single socket may have a multi-core configuration. Furthermore, the processor 11 may include operation devices with various circuit configurations such as a digital signal processor (DSP), a graphics processing unit (GPU) and the like. Further, the processor 11 may be an integrated circuit (IC), other digital circuits or a circuit that works in cooperation with an analog circuit. The integrated circuit may be an LSI, an application specific integrated circuit (ASIC) or a circuit that includes a programmable logic device (PLD). The PLD may include, for example, a field programmable gate array (FPGA). Therefore, the processor 11 may be, for example, what is called a microcontroller (MCU), an SoC (system on a chip), a system LSI, a chip set or the like.

The memory 12 stores instruction sequences (computer programs) to be executed by the processor 11, data to be processed by the processor 11 or the like. The processor 11 and the memory 12 may be called a baseband unit (BBU). The internal interface 13 is a circuit that connects various peripheral devices to the processor. The baseband unit can also be referred to as a processor.

The network IF 14A is a communication device for each base station 1 to access the backbone line 50 to which the other base stations are connected. The backbone line 50 is, for example, a wired network by optical communication. In that case, the network IF 14A is, for example, an X1 interface.

The network IF 14B is a communication device for connecting an MEC server 2. A network for connecting the MEC server 2 is, for example, a LAN (Local Area Network) or the like. The network IF 14B is, for example, a NIC (network interface card). The network for connecting to the MEC server 2 may be a wireless network. In that case, the network IF 14B is a wireless communication circuit.

The wireless processing device 15 includes a transceiver that transmits a wireless signal and a receiver that receives a wireless signal, and is connected to the M antennas 16. The wireless processing device 15 may have the same number of transceivers and receivers as the number of antennas, that is, M systems. The wireless processing device 15 can be in a configuration of being connected to the baseband unit via wired network by optical communication and remotely installed, the configuration being called a remote radio head (RRH). Further, a configuration is also possible in which a plurality of remote radio heads are connected to one baseband unit. A network connecting the baseband unit and the remote wireless heads is also called a front hall.

Next, the control station 3 is, for example, a dedicated or general-purpose computer. The control station 3 is provided with a processor 31, a memory 32, an internal IF 33, a network IF 34 and an external storage device 35 as hardware components. The processor 31, the memory 32, the internal IF 33 and the network IF 34 are similar to the processor 11, the memory 12, the internal interface 13 and the network IF 14A.

The external storage device 35 stores various programs and data to be used by the processor 31 at the time of executing each program. The external storage device 35 is, for example, an EPROM (Erasable Programmable ROM) or a hard disk drive. The programs held in the external storage device 35 include, for example, an operating system (OS) and other various application programs. The hardware components of each base station 1 and the control station 3 are not limited to those illustrated in FIG. 3. Hardware components of each MEC server 2 are similar to those of the control station 3, a processor, a memory, an external storage device and a network interface are provided.

Figure 4:
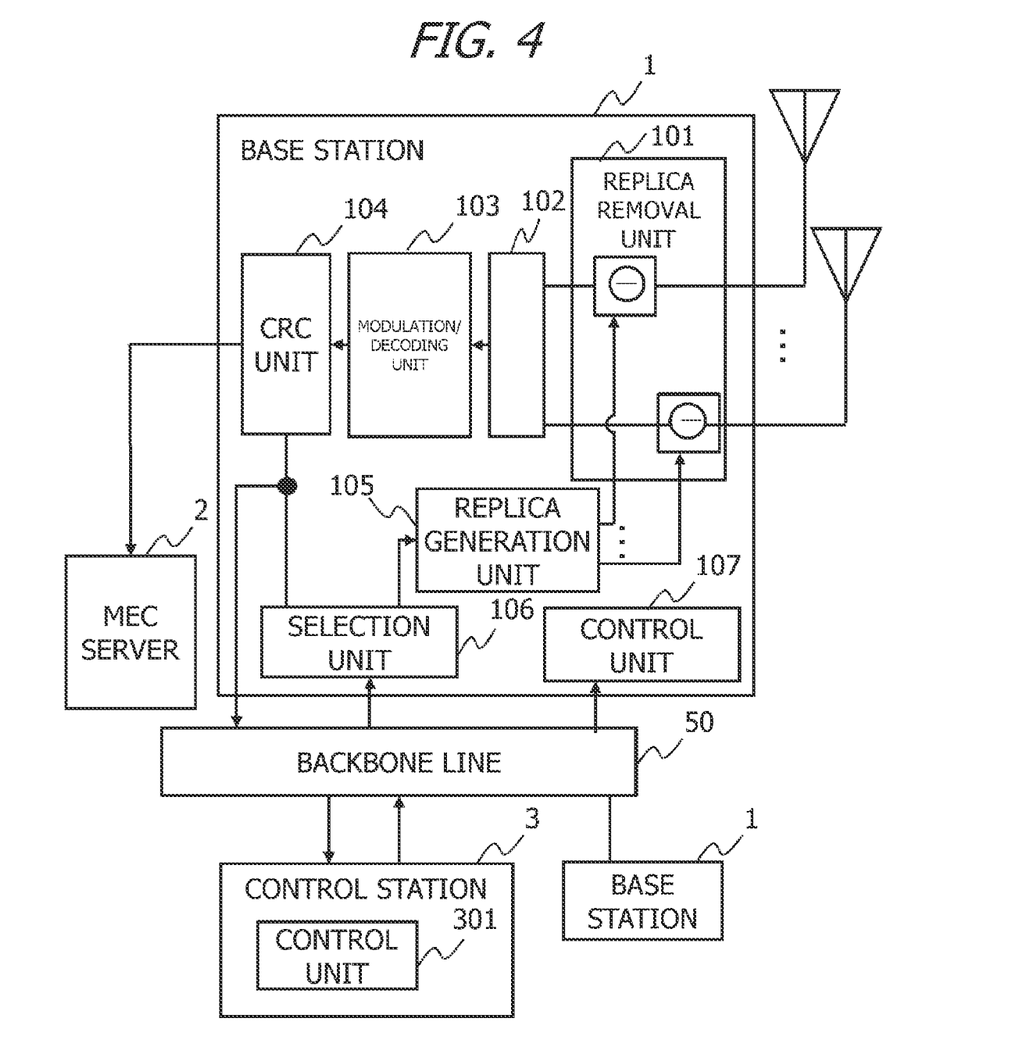
FIG. 4 is a diagram illustrating an example of functional components of each base station and the control station.

FIG. 4 is a diagram illustrating an example of functional components of each base station 1 and the control station 3. The base station 1 includes a replica removal unit 101, a receive diversity processing unit 102, a modulation/decoding unit 103, a CRC unit 104, a replica generation unit 105, a selection unit 106 and a control unit 107. By the processor 11 illustrated in FIG. 3 executing an instruction sequence (a computer program) executably developed on the memory 12, each of processes of the replica removal unit 101, the receive diversity processing unit 102, the modulation/decoding unit 103, the CRC unit 104, the replica generation unit 105, the selection unit 106 and the control unit 107 is executed.

The replica removal unit 101 executes (3) the replica signal removal process of the SIC process. Specifically, from a superimposed signal from which replica signals of received signals received by each of the M receive antennas 16 or received signals from one or more terminals 4 have been removed, the replica removal unit 101 subtracts a replica signal of a received signal from one terminal 4, which has been generated by the replica generation unit 105 to be described later. Since received signals exist for each receive antenna 16, the replica signal generated by the replica generation unit 105 is generated for each receive antenna 16, and the subtraction of the replica signal from the received signal is performed for each receive antenna 16.

The receive diversity processing unit 102, the modulation/decoding unit 103 and the CRC unit 104 execute (1) the desired signal data acquisition process of the SIC process. Receiving input of the superimposed signal from the replica removal unit 101, the receive diversity processing unit 102 performs receive diversity processing using a predetermined weight, for example, by the MMSE method, and takes out a desired signal of a target terminal 4 by suppressing (canceling) interferences other than the desired signal of the target terminal 4. The desired signal of the target terminal 4 is outputted to the modulation/decoding unit 103. As the target terminal 4, for example, a terminal 4 with the largest received power among unseparation terminals 4 may be selected.

The modulation/decoding unit 103 generates (demodulates) a bit string from the desired signal inputted from the receive diversity processing unit 102 and decodes the obtained bit string with an error correction code to acquire data. The decoded data is outputted to the CRC unit 104.

The CRC unit 104 performs a CRC error check for the data inputted from the modulation/decoding unit 103. Specifically, the CRC unit 104 performs a CRC operation for a payload part of the data inputted from the modulation/decoding unit 103 and compares a result of the operation and a value of the CRC part of the data inputted from the modulation/decoding unit 103. If the result of the CRC operation and the value of the CRC part of the data inputted from the modulation/decoding unit 103 match, it is determined that there is no error, and the data inputted from the modulation/decoding unit 103 becomes a hard decision value. On the other hand, if the result of the CRC operation and the value of the CRC part of the data inputted from the modulation/decoding unit 103 do not match, it is determined that there is an error, and the data inputted from the modulation/decoding unit 103 is determined not to be correct data and discarded.

The CRC unit 104 outputs the result of the CRC error check, identification information about the target terminal 4, and, in the case of no error, the hard decision value to the selection unit 106. Further, in the case of no CRC error, the CRC unit 104 outputs the identification information about the target terminal 4 and the hard decision value to the backbone line 50. Further, in the case of no CRC error, the CRC unit 104 transmits the hard decision value to the MEC server 2. Identification information about a terminal 4 is included in a received signal from the terminal 4. In the first embodiment, the identification information about the target terminal 4 and the hard decision value are transmitted to the control station 3 via the backbone line 50.

The replica generation unit 105 executes (2) the replica signal generation process of the SIC process. Specifically, the replica generation unit 105 generates replica signals of the signals received from the target terminal 4 by antennas 16 based on the hard decision value of the target terminal 4 inputted from the selection unit 106. The replica generation unit 105 performs error correction encoding of the inputted hard decision value, performs digital modulation of the error correction encoded signal, executes transmit diversity processing for the digitally modulated signal and multiply a channel matrix by the transmit diversity processed signal to generate replica signals. The replica generation unit 105 outputs the generated replica signals to the replica removal unit 101.

The selection unit 106 receives hard decision values acquired by another base station 1 and identification information about a corresponding terminal 4 from the backbone line 50. The selection unit 106 stores the received hard decision values and identification information about the terminal 4 into a storage area of the memory 12.

The selection unit 106 receives input of the result of the CRC error check from the CRC unit 104. The selection unit 106 selects which of the hard decision value acquired by its own station and the hard decision values received from the other stations is to be used to generate replica signals, based on the result of the CRC error check. If the result of the CRC error check from the CRC unit 104 is that there is no error, the selection unit 106 selects the hard decision value acquired by its own station, that is, the hard decision value inputted from the CRC unit 104, and outputs the hard decision value to the replica generation unit 105. If the result of the CRC error check from the CRC unit 104 is that there is an error, the selection unit 106 selects the hard decision value received from the other stations and outputs the hard decision value to the replica generation unit 105.

The control unit 107 controls processes in the base station 1. The control unit 107 acquires identification information pieces about terminals 4 from which signals have been received by the M receive antennas 16, from the receive diversity processing unit 102, creates a signal reception list that includes the identification information pieces about the terminals 4 from which the signals have been received, and transmits the signal reception list to the control station 3 via the backbone line 50. The identification information pieces about the terminals 4 from which the signals have been received by the antennas 16 are acquired, for example, by reception of reference signals that the terminals 4 transmit before transmitting user data pieces.

The control unit 107 receives an instruction to stop the MIMO reception process from the control station 3 through the backbone line 50. In the case of receiving the instruction to stop the MIMO reception process, the control unit 107 causes the SIC process to be stopped and deletes information about the MIMO reception process. The information about the MIMO reception process includes, for example, identification information pieces about terminals 4 from which signals have been received by the M antennas 16, hard decision values received from the other base stations 1 and identification information about a terminal 4 corresponding to the hard decision values received from the other base stations 1, and the like.

The functional components of each base station 1 is not limited to that illustrated in FIG. 4. In FIG. 4, the base station 1 is provided with one replica generation unit 105 and the selection unit 106, and the selection unit 106 selects hard decision value to be used for generation of a replica signal and outputs the hard decision value to the replica generation unit 105. Instead, the base station 1 may be provided with a replica generation unit 105A that generates a replica signal from the hard decision value acquired by the base station 1, a replica generation unit 105B that generates a replica signal from the hard decision value received from another station, and the selection unit 106, and the selection unit 106 may select, according to a result of CRC error check, which of the replica generation unit 105A and the replica generation unit 105B is to be activated.

Next, the control station 3 is provided with a control unit 301 as a functional component. The control unit 301 grasps all terminals 4 existing in the cell. This is, for example, due to position registration or the like at the time of initial connection of the terminals 4. When simultaneous reception of signals from a plurality of terminals 4 by MIMO occurs, the control unit 301 receives, from each base station 1, a signal reception list of terminals from which the base station 1 has received signals. The signal reception list includes identification information pieces about the terminals from which the base station 1 has received the signals. Thereby, the control unit 301 can grasp terminals 4 transmitting signals in the cell and terminals 4 from which each base station 1 is receiving signals.

The control unit 301 receives a hard decision value and identification information pieces about corresponding terminals 4 from each base station 1 through the backbone line 50. Thereby, the control unit 301 can grasp demodulation states of the terminals 4 transmitting signals in the cell under the control of the control unit 301. The control unit 301 causes a hard decision value received from one base station 1 and identification information about corresponding terminals 4 to be shared among the base stations 1. Specifically, the control unit 301 identifies base stations 1 receiving signals from a terminal 4 the identification information about which the control unit 301 has received, and transmits a received hard decision value and the identification information about the corresponding terminal 4 to base stations 1 other than the base station 1 from which the hard decision value has been received among the identified base stations 1. The present embodiment is not limited thereto, and the control unit 301 may transmit, when receiving hard decision value and identification information about a corresponding terminal 4 from one base station, the received hard decision value and identification information about the corresponding terminal 4 to the other base stations 1.

When detecting that signal demodulation has been completed for all terminals 4 transmitting signals in the cell under the control of the control unit 301, the control unit 301 transmits an instruction to stop the MIMO reception process to each base station 1 in the cell through the backbone line 50. When receiving the instruction to stop the MIMO reception process, each base station 1 stops the SIC process and deletes information about the MIMO reception.

Figure 5:
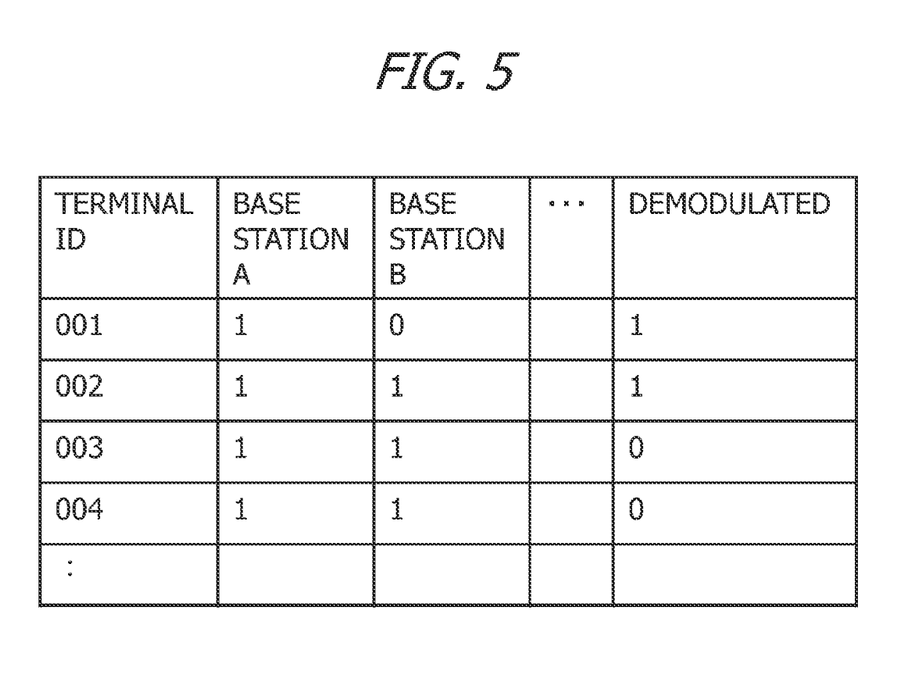
FIG. 5 illustrates an example of a terminal management table of the control station.

FIG. 5 illustrates an example of a terminal management table of the control station 3. The terminal management table is a table for managing signal transmission states of terminals 4 in the cell and signal demodulation states of signals at the time of MIMO reception of terminals 4 in the cell. The terminal management table is stored, for example, in a storage area of the memory 32 of the control station 3.

The terminal management table includes the same number of entries as the number of terminals 4 existing in the cell. When detecting a terminal 4 that has newly entered the cell, the control unit 301 adds an entry for the terminal 4 to the terminal management table. When detecting that a terminal 4 has left the cell, the control unit 301 deletes the entry for the terminal 4 from the terminal management table.

Each entry includes "terminal ID", "base station A", "base station B", " . . . ", and "demodulated" fields. In each "terminal ID" field, identification information about a terminal 4 existing in the cell is stored. In the "base station A", "base station B", " . . . " fields, flags indicating whether the indicated base stations in the cell receive a signal from the terminal 4 or not are stored. For example, when a base station X receives a signal from a terminal 4 corresponding to the entry, the value of the "base station X" field is "1". Initial values of the "base station A", "base station B", " . . . " fields are "0". For example, when a signal reception list received from the base station X includes identification information about a terminal #N corresponding to an entry, the "base station X" field for the terminal #N is flagged by the control unit 301.

In each "demodulated" field, a flag indicating whether demodulation of a signal of a terminal 4 corresponding to the entry has been completed or not is stored. For example, if demodulation of the signal from the terminal 4 corresponding to the entry has been completed, the value of the "demodulated" field for the terminal 4 is "1". An initial value of each "demodulated" field is "0". When the identification information about the terminal #N and a hard decision value are received from any base station 1, the "demodulated" field for the terminal #N is flagged by the control unit 301.

The control unit 301 of the control station 3 identifies a base station 1 to which a hard decision value and identification information about a terminal 4 received from one base station 1 is to be transmitted, based on the terminal management table. Further, the control unit 301 of the control station 3 determines whether demodulation of signals of all terminals 4 transmitting signals in the cell has been completed or not based on the terminal management table. The terminal management table illustrated in FIG. 5 is an example, and the terminal management table is not limited to that illustrate in FIG. 5.

Figure 6:
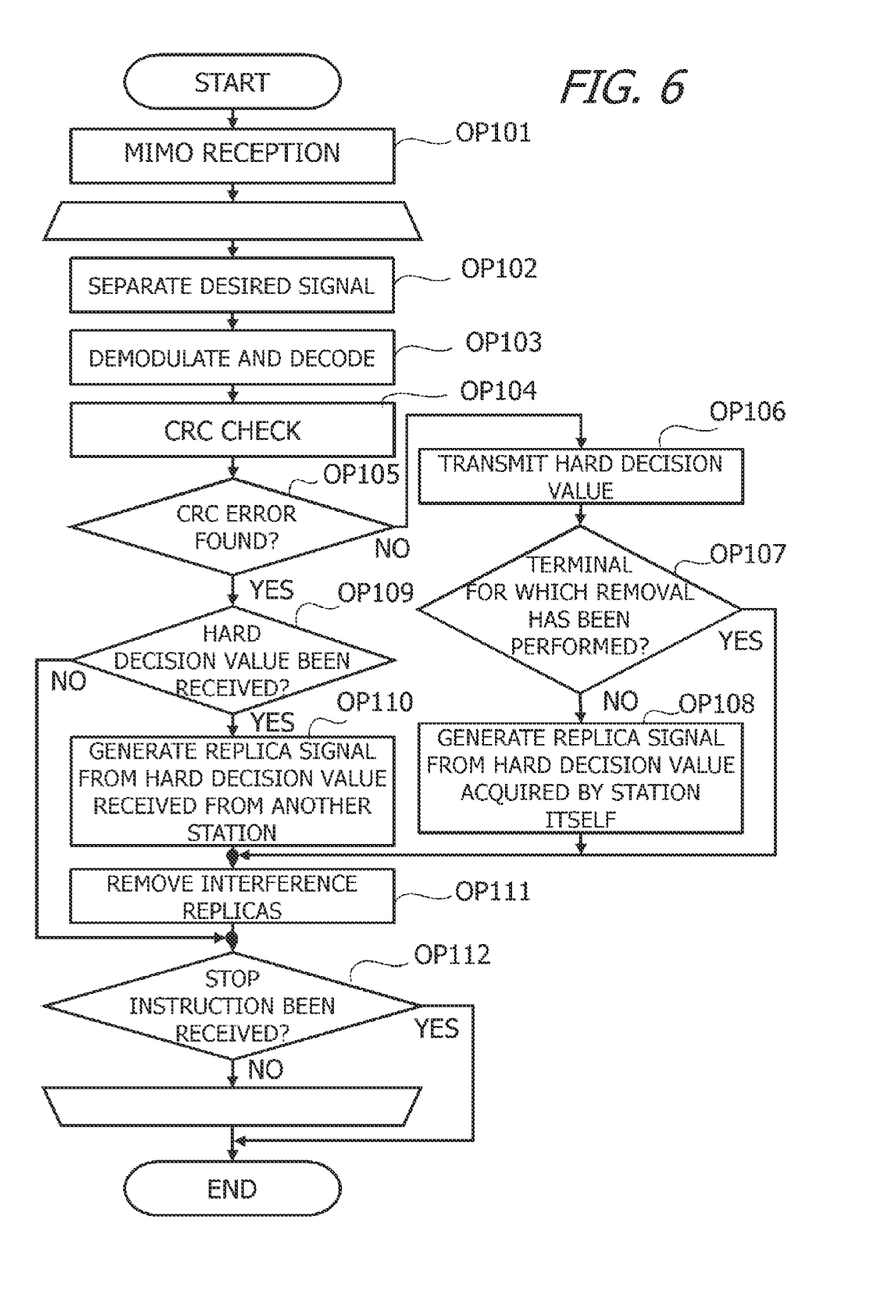
FIG. 6 illustrates an example of a flowchart of the MIMO reception process of each base station.

FIG. 6 illustrates an example of a flowchart of the MIMO reception process of each base station 1. The process illustrated in FIG. 6 is repeatedly executed while the base station 1 is operating. At OP101, the processor 11 acquires received signals (a superimposed signal) in MIMO received by the M receive antennas 16 and the wireless processing device 15. The number of terminals of the received signals is assumed to be N. Further, at OP101, the processor 11 generates a signal reception list and transmits the signal reception list to the control station 3.

The process at and after OP102 is repeatedly executed the number of times corresponding to the number of the terminals of the received signals N−1 or until an instruction to stop the MIMO reception process is received from the control station 3. At OP102, the processor 11 determines a target terminal 4 and acquires a signal received from the target terminal 4 (a desired signal) by separating the desired signal from the received signals, for example, by the MMSE method. The process of OP102 corresponds to the process of the receive diversity processing unit 102.

At OP103, the processor 11 performs a digital demodulation process for the desired signal acquired by the process of OP102 and, furthermore, performs decoding with an error correction code. That is, the processor 11 takes out a bit string as a baseband signal from the desired signal, which is a modulated carrier signal, and decodes data from an error correction encoded signal, which is the baseband signal demodulated. The process of OP103 corresponds to the process of the modulation/decoding unit 103.

At OP104, the processor 11 performs a CRC check for the data acquired by the process of OP103. The process of OP103 corresponds to the process of the CRC unit 104.

At OP105, the processor 11 determines whether or not a result of the CRC check of the data acquired by the process of OP103 is that there is an error. If the result of the CRC check of the data acquired by the process of OP103 is that there is an error (OP105: YES), the process proceeds to OP109. If the result of the CRC check of the data acquired by the process of OP103 is that there is no error (OP105: NO), the process proceeds to OP106.

At OP106, the processor 11 transmits a hard decision value, which is data the check result of which is that there is no error, to the control station 3 via the backbone line 50 and to a MEC server 2 connected to its own station. At OP107, the processor 11 determines whether or not the target terminal 4 is a terminal for which a replica signal has been removed from the superimposed signal. If the target terminal 4 is a terminal for which a replica signal has been removed from the superimposed signal (OP107: YES), the process proceeds to OP111. If the target terminal 4 is not a terminal for which a replica signal has been removed from the superimposed signal (OP107: NO), the process proceeds to OP108.

At OP108, the processor 11 generates a replica signal of the received signal from the target terminal 4 from the hard decision value acquired at OP103, that is, the hard decision value acquired by its own station.

At OP109, the processor 11 determines whether hard decision value about the target terminal 4 acquired by another base station 1 have been received or not. If the hard decision value of the target terminal 4 acquired by another base station 1 have been received (OP109: YES), the process proceeds to OP110. If the hard decision value of the target terminal 4 acquired by another base station 1 have not been received (OP109: NO), the process proceeds to OP112.

At OP110, the processor 11 generates a replica signal of the received signal from the target terminal 4 from the hard decision value of the target terminal 4 acquired by the other base station 1. The processes of OP105 to OP110 corresponds to the processes of the selection unit 106 and the replica generation unit 105.

At OP111, the processor 11 removes the replica signal generated by the process of OP108 or OP110 from the superimposed signal. The process of OP111 corresponds to the process of the replica removal unit 101.

At OP112, the processor 11 determines whether or not an instruction to stop the MIMO reception process has been received from the control station 3. If the instruction to stop the MIMO reception process has been received from the control station 3 (OP112: YES), the processor 11 deletes information about the MIMO reception process in the memory 12, and the process illustrated in FIG. 6 ends. If the instruction to stop the MIMO reception process has not been received from the control station 3 (OP112: NO), the process proceeds to OP102 for an unseparation terminal 4. The process of OP112 corresponds to the process of the control unit 107.

When overload MIMO has not occurred, that is, in the case of the number of antennas M the number of terminals N, interference signals do not influence much on the desired signal in the receive diversity processing, and, therefore, the probability of occurrence of an error in the CRC check is low. Therefore, when overload MIMO has not occurred, a negative determination is made at OP105, and it is possible to separate a signal for each of the N terminals to acquire data, without using hard decision value received from another station. If overload MIMO has occurred, the possibility that a CRC error occurs is strong as described above. Therefore, the possibility that a positive determination is made at OP105 is strong, and the possibility of using hard decision value received from another station is strong.

Figure 7:
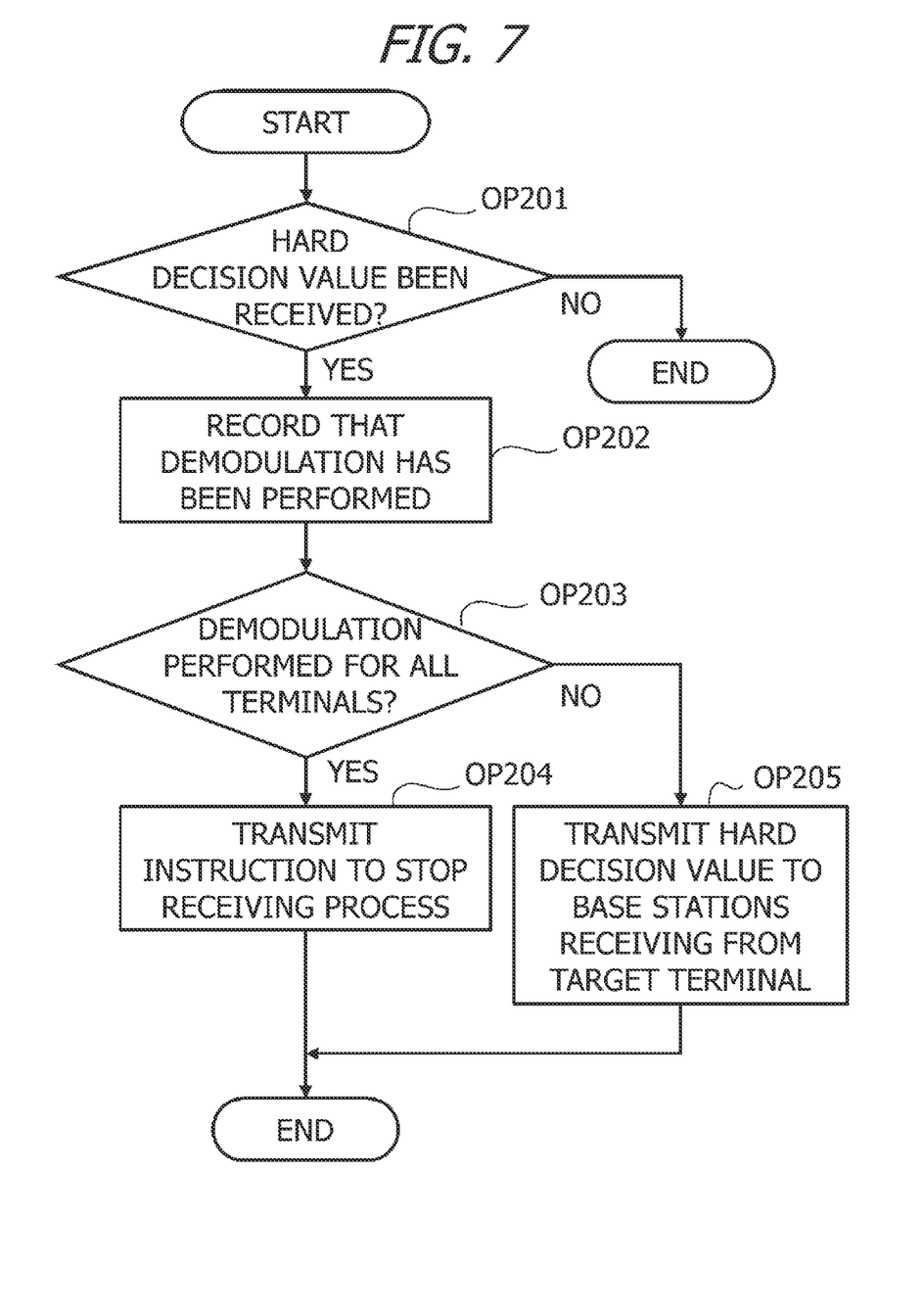
FIG. 7 illustrates an example of a flowchart of a terminal management process of the control station.

FIG. 7 illustrates an example of a flowchart of a terminal management process of the control station 3. The process illustrated in FIG. 7 is repeatedly executed in a predetermined period.

At OP201, the processor 31 determines whether a hard decision value and identification information about a corresponding terminal 4 have been received from each base station 1. If a hard decision value and identification information about a corresponding terminal 4 have been received from the base station 1 (OP201: YES), the process proceeds to OP202. If a hard decision value and identification information about a corresponding terminal 4 have not been received from the base station 1 (OP201: NO), the process illustrated in FIG. 7 ends.

At OP202, the processor 31 flags the "demodulated" field of an entry the "terminal ID" field of which has a value corresponding to the received identification information in the terminal management table to record that demodulation of a signal from the terminal 4 of the received identification information has been completed.

At OP203, the processor 31 refers to the terminal management table to determine whether signal demodulation has been completed for all terminals 4 transmitting signals in the cell. If signal demodulation has been completed for all the terminals 4 transmitting signals in the cell (OP203: YES), the process proceeds to OP204. At OP204, the processor 31 transmits an instruction to stop the MIMO reception process to each base station 1 through the backbone line 50. After that, the process illustrated in FIG. 7 ends.

At OP203, if there is a terminal 4 for which signal demodulation has not been completed among the terminals 4 transmitting signals in the cell (OP203: NO), the process proceeds to OP205. At OP205, the processor 31 extracts base stations 1 receiving a signal from the terminal 4 corresponding to received identification information, from the terminal management table, and transmits a received hard decision value and identification information about the corresponding terminal 4 to the extracted base stations 1. After that, the process illustrated in FIG. 7 ends.

Operation and Effects of First Embodiment

In the first embodiment, by sharing a hard decision value among the base stations 1, it is possible to, even for data that has caused an error in overload MIMO, use a hard decision value corresponding to a terminal 4 that has transmitted the data to generate a replica signal of a signal from the terminal. Thereby, inter-terminal interference removal performance in the base stations 1 is improved, and wireless communication quality is improved.

In the first embodiment, since each base station 1 demodulates signals from terminals 4 to acquire data, it is possible to, by connecting an MEC server 2 to the base station 1 and causing the MEC server 2 to process the data, return responses to the terminals 4 earlier and achieve low latency.

In the first embodiment, each base station 1 sends a hard decision value to the backbone line 50. Since the hard decision value is binarized data, the size is smaller, for example, compared with a baseband signal. Therefore, according to the first embodiment, it is possible to reduce use of the bandwidth of the backbone line 50.

In the first embodiment, the control station 3 receives a hard decision value and identification information about a terminal 4 from each base station, extracts other base stations 1 receiving signals from the terminal 4, and transmits the received hard decision value and identification information about the terminal 4 to the extracted base stations 1. Thereby, it is possible to prevent the hard decision value and the identification information about the terminal 4 from being transmitted to base stations 1 that do not need the hard decision value of the terminal 4.

In the first embodiment, the control station 3 manages demodulation states of signals of terminals 4 transmitting signals in the cell under the control of the control station 3 by receiving hard decision values and identification information pieces about terminals 4 from each base station 1. When detecting that demodulation of the signals from all the terminals transmitting signals in the cell under the control of the control station 3 has been completed, the control station 3 transmits an instruction to stop the MIMO reception process to each base station 1. Thereby, each base station 1 can stop the MIMO reception process, for example, even when there is an unseparation terminal 4, and, therefore, it is possible to reduce the processing load on each base station 1. The process illustrated in FIG. 7 corresponds to the process of the control unit 301 of the control station 3.

Further, for example, compared with a case where each base station 1 does not demodulate received signals from terminals, and baseband signals are collected to the control station 3 so that the control station 3 performs demodulation, the total amount of MIMO operation of the whole system is smaller in the case where each base station 1 demodulates received signals from terminals in the first embodiment. This is due to the matrix size in the operation in the receive diversity processing increasing as the number of antennas increases. For example, if it is assumed that the number of antennas in each base station 1 is M, the matrix size in the operation in the receive diversity processing is M×M when each base station 1 performs demodulation like the first embodiment. On the other hand, in the case where the control station 3 performs demodulation from baseband signals, the matrix size in the operation in the receive diversity processing is (M×the number of base stations)× (M×the number of base stations).

OTHER EMBODIMENTS

The embodiment described above is an example, and the present disclosure may be changed and carried out as appropriate without departing from the gist of the present disclosure.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. A base station comprising:
   a communication unit configured to connect to a backbone line to which one or more base stations are connected;
   M receive antennas, where M is an integer greater than 1; and
   a processor configured to execute:
      a first process of acquiring, from among a plurality of signals, a first signal arrived from a first terminal, by processing the plurality of signals with a predetermined process, and acquiring first data by demodulating and decoding the first signal, wherein the plurality of signals are simultaneously received from N terminals, where N is an integer greater than 1, and the first terminal is one of the N terminals;
      a second process of generating a second signal by encoding and modulating the first data, the second signal being a replica of a signal arrived from the first terminal and included in the received plurality of signals before the plurality of signals are processed by the predetermined process;
      a third process of acquiring third signals by excluding the second signal from the received plurality of signals before the plurality of signals are processed by the predetermined process; and
      sequentially repeating the first to third processes for the third signals, with one of N−1 terminals obtained by excluding the first terminal from the N terminals as a new first terminal; wherein
   the processor is configured to share the first data acquired by the first process with one or more other base stations through the backbone line; and
   the processor is configured to execute, in response to a determination that the N is larger than M, the second and third processes for terminals for which the first data has not been acquired by the first process, using data that correspond to the first data and are received from at least one of the one or more other base stations.

2. A system comprising at least one set of a base station and a server:
   the base station including:
      a communication unit configured to connect to a backbone line to which one or more base stations are connected;
      M receive antennas, where M is an integer greater than 1; and
      a processor configured to execute:
         a first process of acquiring, from among a plurality of signals, a first signal arrived from a first terminal, by processing the plurality of signals with a predetermined process, and acquiring first data by demodulating and decoding the first signal, wherein the plurality of signals are simultaneously received from N terminals, where N is an integer greater than 1, and the first terminal is one of the N terminals;
         a second process of generating a second signal by encoding and modulating the first data, the second signal being a replica of a signal arrived from the first terminal and included in the received plurality of signals before the plurality of signals are processed by the predetermined process;
         a third process of acquiring third signals by excluding the generated second signal from the received plurality of signals before the plurality of signals are processed by the predetermined process; and
         sequentially repeating the first to third processes for the third signals, with one of N−1 terminals obtained by excluding the first terminal from the N terminals as a new first terminal;
      wherein
         the processor is configured to share the first data acquired by the first process with one or more other base stations through the backbone line;
         the processor is configured to execute, in response to a determination that the N is larger than M, the second and third processes for terminals for which the first data has not been acquired by the first process, using data that correspond to the first data and are received from at least one of the one or more other base stations; and
      the server is configured to perform a process according to the first data acquired by the first process by the base station to respond to the first terminal.

3. The system according to claim 2 further comprising an information processing apparatus, the information processing apparatus including:
   a communication unit configured to be connected to the backbone line; and a processor configured to:
  receive the first data transmitted from the base station; and
  transmit the first data to the one or more other base stations.

4. The system according to claim 3, wherein
the processor of the information processing apparatus identifies, among the one or more other base stations, first base stations receiving a signal from the first terminal; and
transmits the first data to the first base stations.

5. The system according to claim 3, wherein the at least one set of a base station and a server is a plurality of sets of a base station and a server, and
  the processor of the information processing apparatus is configured to transmit an instruction to a plurality of base stations included in the plurality of the sets of a base station and a server to instruct the plurality of base stations to stop the first to third processes when the first data is acquired from all of a plurality of terminals existing in a cell including the plurality of base stations.

6. A method comprising: executing, by a base station, a first process, a second process, and a third process, wherein
  the base station includes a communication unit configured to connect to a backbone line to which one or more base stations are connected, and M receive antennas, where M is an integer greater than 1;
  the first process includes acquiring, from among a plurality of signals, a first signal arrived from a first terminal, by processing the plurality of signals with a predetermined process, and acquiring first data by demodulating and decoding the first signal, wherein the plurality of signals are simultaneously received from N terminals, where N is an integer greater than 1, and the first terminal is one of the N terminals;
  the second process includes generating a second signal by encoding and modulating the first data, the second signal being a replica of a signal arrived from the first terminal and included in the received plurality of signals before the plurality of signals are processed by the predetermined process; and
  the third process includes acquiring third signals by excluding the second signal from the received plurality of signals before the plurality of signals are processed by the predetermined process; and
  sequentially repeating, by the base station, the first to third processes for the third signals, with one of N−1 terminals obtained by excluding the first terminal from the N terminals as a new first terminal,
wherein
  the method further includes sharing, by the base station, the first data acquired by the first process with one or more other base stations through the backbone line; and
  executing, by the base station, in response to a determination that the N is larger than M, the second and third processes for terminals for which the first data has not been acquired by the first process, using data that correspond to the first data and are received from at least one of the one or more other base stations.

7. The method according to claim 6, further comprising:
  receiving, by an information processing apparatus, the first data transmitted from the base station; and
  transmitting, by the information processing apparatus, the first data to the one or more other base stations,
  wherein the information processing apparatus includes a communication unit configured to be connected to the backbone line.

8. The method according to claim 7, wherein
  the information processing apparatus identifies first base stations receiving a signal from the first terminal; and
  the information processing apparatus transmits the first data to the first base stations among the one or more other base stations.

9. The method according to claim 7, further comprising transmitting, by the information processing apparatus, an instruction to stop the first to third processes to a plurality of base stations included in the plurality of sets of a base station and a server when the first data is acquired from all of a plurality of terminals existing in a cell including the plurality of base stations.

* * * * *